United States Patent [19]

Parker

[11] Patent Number: 4,966,427

[45] Date of Patent: Oct. 30, 1990

[54] FLEXIBLE SCANWHEEL

[75] Inventor: Merle D. Parker, Oceanside, Calif.

[73] Assignee: Hughes Aircraft Company, Los Angeles, Calif.

[21] Appl. No.: 383,829

[22] Filed: Jul. 21, 1989

[51] Int. Cl.⁵ .............................................. G02B 26/08
[52] U.S. Cl. ....................................... 350/6.8; 358/206
[58] Field of Search .................... 350/6.1, 6.5, 6.7, 6.8; 250/236; 358/206

[56] References Cited

U.S. PATENT DOCUMENTS

| | | | |
|---|---|---|---|
| 2,244,603 | 6/1941 | Bauer | 74/5 |
| 3,529,884 | 9/1970 | Ives et al. | 350/6.8 |
| 3,772,464 | 11/1973 | Chan et al. | 358/206 |
| 4,043,632 | 8/1977 | Jeffery et al. | 350/7 |
| 4,047,793 | 9/1977 | Lang | 350/7 |
| 4,141,620 | 2/1979 | Goshima et al. | 350/6.8 |

Primary Examiner—Bruce Y. Arnold
Assistant Examiner—Tho Van Tran
Attorney, Agent, or Firm—Joseph E. Szabo; Wanda K. Denson-Low

[57] ABSTRACT

A multifaceted aluminum scanwheel 11 mounted for rotation on a steel bearing assembly 19 is made less susceptible to thermally-induced stresses by the provision of a specially-configured web section 17 that extends between the hub 15 and facet ring portions 13 of the wheel 11. A circumferential, slotted jog section 45 provides the flexibility to relieve compressive forces in the web 17 which might distort either the bearing assembly 19 or the scanwheel facet ring 13, or both.

10 Claims, 2 Drawing Sheets

4,966,427

FLEXIBLE SCANWHEEL

CROSS-REFERENCE TO RELATED APPLICATION

The present invention is related to U.S. patent application Ser. No. 383,826, filed on even date herewith by the present inventor, for "Scanwheel Assembly With Strain Relieved Hub."

BACKGROUND OF THE INVENTION

1. Field of the Invention

This invention relates generally to infrared (IR) scanners and more specifically to multifaceted scanning wheels for such scanners.

2. Description of Related Art

Infrared scanners, to which the present invention relates, comprise a multifaceted scanwheel mounted for rotation on a bearing, means for projecting infrared light at the rim of the wheel as it spins at high speed and for detecting the light reflected by the facets, and a drive motor and associated electronics for spinning the scanwheel at a controlled, steady speed.

To meet minimum optical performance requirements, the scanwheel facets must be precisely oriented relative to the axis of rotation of the scanwheel and, in order to minimize power consumption, the friction encountered by the bearing should be as low as possible. When used in military applications, such scanners may be subjected to shock loads up to 100 G and also to high frequency vibration and, hence, must be strong and mechanically stiff, with a resonant frequency above a certain level, such as 500 Hz. Such scanners are also required to work under extremes of temperature, which may range from $-55°$ to $+72°$ C.

Minimum weight is frequently an additional design requirement. Hence, the bearing is usually made of steel for strength, the scanwheel of aluminum for minimum weight. These metals have radically different coefficients of thermal expansion and of conductivity. As a result, when the scanwheel assembly is exposed to expected changes in temperature, and particularly to a drop in temperature, stresses are introduced which can result in compression of the bearing, causing dramatically increased power consumption. And a shift in temperature either up or down over the extremes which the scanner may be expected to encounter may cause drastic distortion of the scanner wheel facets, unacceptably degrading optical performance. These stresses are inherent in the construction of scanwheels which typically include a facet ring containing a plurality of flat, high-reflective facets, a hub at the center of the ring for mounting it on a bearing assembly, and a disk-shaped web connecting the ring to the hub. The hub is tightly fitted onto the bearing assembly while the scanning wheel is at an elevated temperature and then cooled to achieve an interference fit. As the scanwheel cools, it contracts, placing its web in compression. Unless the compression is relieved, it exerts a reaction force against the bearing and the facet ring, distorting both.

Measures to isolate the bearing and facets from thermally induced stresses tend to conflict with the need for shock and vibration resistance, because stress isolation calls for increased flexibility, whereas resistance to shock and vibration call for increased stiffness.

SUMMARY OF THE INVENTION

In accordance with the invention a jog section comprising an axially-extending wall having a plurality of symmetrically-distributed strain relief slots therein is provided in the web section of the scanwheel. Preferably, the jog section is constituted of the inner wall of a circumferential channel between the hub and facet ring of the scanwheel. Further strain relief may be provided in accordance with the invention by additionally including a plurality of circumferentially-distributed outer slots between the strain relief slots and the facet ring. The strain relief slots and the outer slots should be mutually staggered circumferentially for best results.

The slotted jog section constitutes a plurality of circumferentially-distributed axial beams which are stiff in axial compression but flexible when subjected to radial forces. The axially stiff but radially flexible beams withstand axial shock and vibration while they absorb thermally induced strains by bending. Staggering of the two sets of slots eliminates direct force paths between hub and facet ring, further reducing the likelihood of distortion due to thermal effects.

DESCRIPTION OF THE PREFERRED EMBODIMENTS

Figure 1:
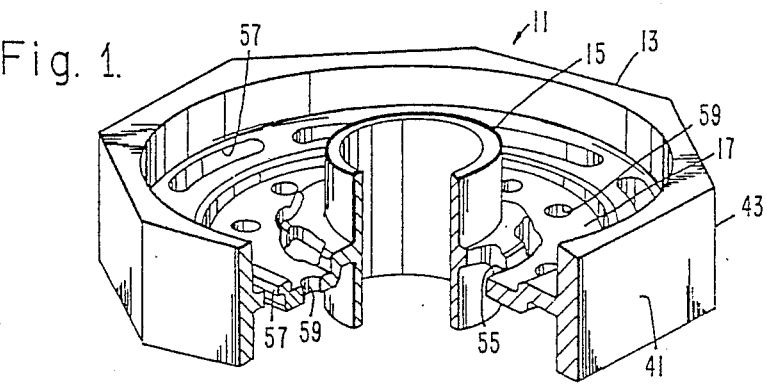
FIG. 1 is a perspective partially broken away view of a scanwheel incorporating features of the present invention.

A scanwheel 11 incorporating features of the present invention as illustrated in FIGS. 1 through 4, is preferably machined from an aluminum alloy and comprises a polygon-shaped facet ring 13 having an axis of rotation 12 and a cylindrical hub 15 coaxial therewith. A disk-shaped web 17 connects the facet ring 13 to the hub 15 which is interference fitted on a bearing assembly 19. The bearing assembly, typically all steel, includes a central shaft 21, an inner race ring 23, an outer race sleeve 25 and two sets of bearing balls 27 and 29 located in axially-spaced-apart raceways formed between the shaft 21 and inner race ring 23 facing the outer race sleeve 25. An intermediate sleeve 31, for flexibly coupling the scanwheel 11 to the bearing assembly 19, is positioned between the two. Provision of the intermediate sleeve 31 is a separate invention covered in my copending patent application filed on even date herewith, entitled "Scanwheel Assembly With Strain Relieved Hub." That application is incorporated herein by this reference as if fully set forth. Preferably the intermediate sleeve 31 includes a peripheral strain relieving channel in its outer surface disposed symmetrically between ends of the sleeve so as to allow deflection of the hub into the strain relieving channel during thermally-induced excursions of the web 17. While desirable, use of the aforesaid invention is not necessary with the invention described herein and is for that reason not described or shown in greater detail.

The facet ring 13 comprises a plurality of highly-polished facets 41 which serve as mirrors for deflecting a beam of incident light. They are separated by interfaces 43, giving the external surface of the facet ring 13 its polygonal shape. Extending between the hub 15 and the ring 13 is a plate-like web whose inner and outer ring portions 48 and 50 extend from the midpoints of the hub 15 and the ring 13, respectively. If the web 17 lay in a single plane with the inner and outer ring portions 48 and 50 running into each other, considerable compressive forces would be imposed upon the web during thermal cycling of the scanwheel 11 and the bearing assembly 19. Such cycling would begin when the two are assembled. Normally the intermediate sleeve 31 would be machined for an interference fit between itself and the outer race sleeve 25, and the sleeve 31 would be elevated in temperature relative to the outer race sleeve 25 so that the two could be assembled and the intermediate sleeve 31 allowed to contract so as to capture the outer race sleeve 25. Similarly, the inner diameter of the scanwheel hub 15 would be machined for an interference fit between itself and the intermediate sleeve 31, and the scanwheel would be elevated in temperature relative to the bearing assembly 19 so as to permit the latter to be inserted in the hub 15. When the assembly is completed, with the hub 15 having received within it the bearing assembly 19, the entire assembly would be permitted to assume a common temperature.

In the course of approaching temperature equilibrium, the facet ring 13 will contract, as will the hub 15. However, due to the greater stiffness and lower coefficient of expansion of the steel bearing assembly 19, the flat web portion is placed in compression, causing both the bearing assembly 19 and the facets 41 to be subjected to distortion due to the force reactions in the web 17. In accordance with the present invention, the compression forces thus imposed on the web 17 are reduced by so configuring the web 17 as to permit it to flex radially, thus relieving compressive forces thereon. In particular, a jog section 45 is provided comprising an axially-extending wall 49 having a plurality of symmetrically-distributed strain relief slots 55 therein. In the preferred embodiment illustrated, the jog section 45 is created by provision of a U-shaped circumferential channel intermediate the hub 15 and the ring 13 and concentric therewith, the channel 47 including an inner axially-extending wall 49, an outer axially-extending wall 51 and a floor section 53 between them. Preferably the jog section 45 is formed of the inner wall 49 in which the strain relief slots 55 are cut. An additional plurality of circumferentially-distributed outer slots 57 between the strain relief slots 55 and the facet ring 13 may be provided in the outer ring portion 50 for added strain relief. Preferably the two sets of slots 55 and 57 are mutually staggered circumferentially, with the strain relief slots 55 being centered on the interfaces 43 between the facets 41, and the outer slots 57 being centered on the facets 41 themselves. As a further means for minimizing a direct path of metal between hub 15 and ring 13, a third set of slots 59 in the floor section 53 may be provided, with these slots being positioned to lie on the radii which extend from the axis of rotation 12 midway through the respective strain relief slots 55.

Figure 5:
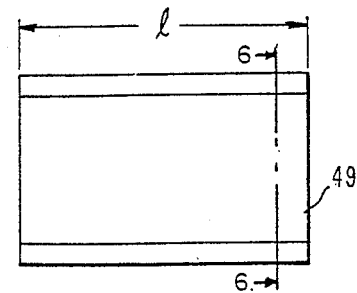
FIG. 5 is a sectional view along line 5—5 of an axial beam between adjacent slots of the jog section of the scanwheel of FIG. 2.
Figure 6:
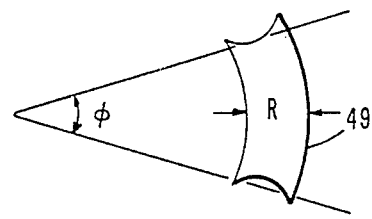
FIG. 6 is a section along line 6—6 through the axial beam of FIG. 5.
Figure 7:
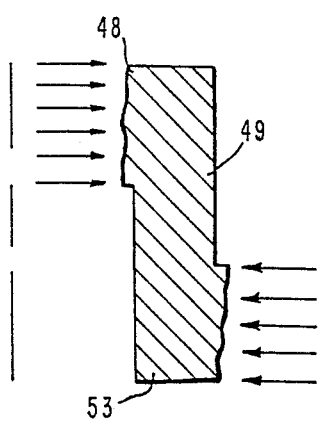
FIG. 7 is a cross-section along line 7—7 of FIG. 2 showing the forces on the jog section of the scanwheel.
Figure 8:
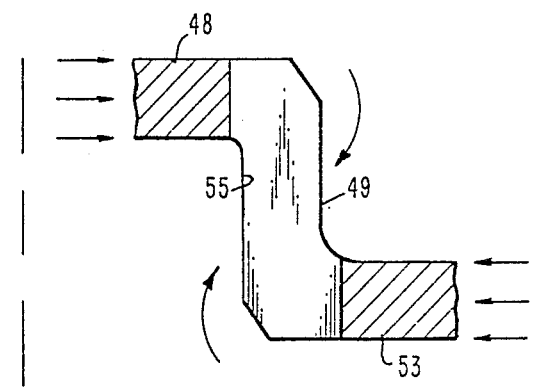
FIG. 8 is a cross-section along line 8—8 of FIG. 2 showing the forces on the jog section in the vicinity of a slot therein.

The action of the jog section 45 can best be understood by considering cross sections through the web shown at FIGS. 7 and 8. As the web 17 undergoes compression or tension by radial forces due to thermal excursion, the axial sections 49 of the web are put into transverse bending. The bending stiffness of the sections 49 is a function of their radial thickness R (see FIG. 6), their length L (FIG. 5), and the angle $\phi$ subtended by the section when measured from the radius of rotation 12. The amount of deformation under a given set of circumstances such as thermal excursion that will be allowed by the sections 49 can be readily matched to design requirements by varying the dimensions R, L and $\phi$.

A major design tradeoff which must be made in designing IR scanners is between flexibility (to accommodate thermally-induced distortions) and stiffness (to withstand vibration and shock). The presence of an optical encoder (not shown) which is usually mounted coaxially with the scanwheel 11 makes the scanner susceptible to damage by axial shock and vibration because axial displacement of the encoder codewheel relative to its sensing head will cause them to contact and damage each other. The axial sections 49 respond as stiff columns to axial loads such as shock and vibration, but as bending beams to radial loads brought about by thermal effects. Thus, radial flexibility, which is important to withstand thermal deformation, is maintained while also preserving axial stiffness in vibration and shock. It is noteworthy that, by providing slots only on the inner wall 49 while leaving the outer wall 51 continuous preserves the hoop resistance of the outer ring portion 50, which helps to control the tendency of the facets 41 to rotate relative to the axis of rotation 12 under the influence of bending moments caused by thermally or otherwise induced radial stress.

Figure 2:
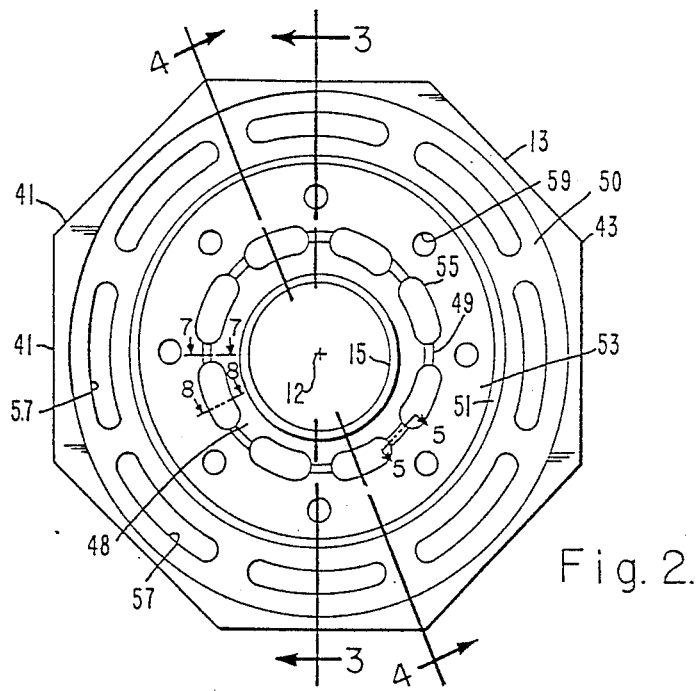
FIG. 2 is a plan view of the scanwheel of FIG. 1.
Figure 3:
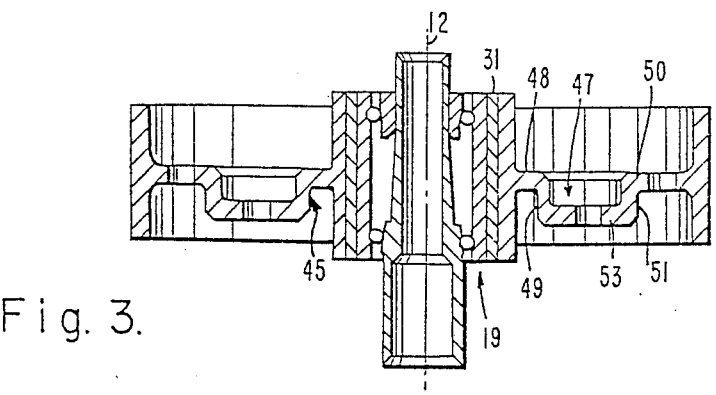
FIG. 3 is a cross-section along line 3—3 of FIG. 2.
Figure 4:
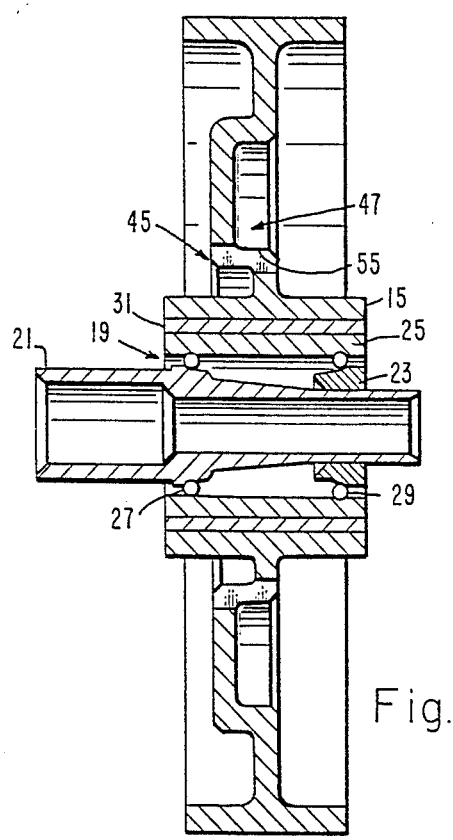
FIG. 4 is a cross-section along line 4—4 of FIG. 2.

Further insight into the action of the slots 55, 57 and 59 may be gained by considering the plan view of the web as shown in FIG. 2. As they are shown, the slots transform the web 17 into a series of flexures. Because the slots are offset circumferentially from each other, there is no direct stress path from the hub 15 to the facets 41. Radial stress in the plane of the web is absorbed by bending of the edges of the slots 55, as shown in FIG. 8, preventing distortion of the facets 41. Moreover, provision of the strain relief slots 55 through the axial jog 45 formed by the inner wall 49 significantly reduces that section's resistance to hoop stress. As a result, the inner wall 49 may be considered as a series of axial columns in transverse bending rather than as a cylinder in radial compression at its ends.

There has accordingly been provided an improved scanwheel in which the effects of thermally-induced radial stresses are absorbed with minimum detrimental effects on power consumption (due to bearing compression) and optical performance (due to facet distortion) and, while thermally-induced distortion problems are greatly diminished, due to increased radial scanwheel flexibility, axial stiffness and strength are left substantially unimpaired.

The radial strain relieving techniques of the present invention may be used either separately from, or preferably in combination with, those of my related invention cross referenced hereinabove. If both inventions are used in combination, flexing will occur in two regions: the hub and the web. Their effect will be cumulative, both contributing to the ability of the scanwheel to absorb radial expansion in a region remote from the facet ring.

What is claimed is:

1. A scanwheel comprising:
   (a) a facet ring having a plurality of facets arranged about a common axis of revolution;
   (b) a hub within said ring and concentric therewith;
   (c) a web connecting said hub and said ring, said web having a circumferential jog section intermediate said hub and said ring; and
   (d) said jog section comprising an axially extending wall having a plurality of symmetrically distributed strain relief slots therein.

2. The scanwheel of claim 1 wherein said web includes a circumferential channel intermediate said hub and said ring and concentric therewith, said channel including an inner wall, an outer wall and a floor section between said walls, said inner wall forming said circumferential jog section.

3. The scanwheel of claim 1 wherein said strain relief slots are elongated circumferentially.

4. The scanwheel of claims 1 or 2 or 3 wherein said web additionally includes a plurality of circumferentially distributed outer slots between said plurality of strain relief slots and said facet ring.

5. The scanwheel of claim 4 wherein said strain relief slots and said outer slots are mutually staggered circumferentially.

6. The scanwheel of claim 5 wherein adjacent ones of said facets are joined at respective interfaces, said strain relief slots are centered on said interfaces, and said outer slots are centered on said facets.

7. The scanwheel of claim 1 wherein adjacent ones of said facets are joined at respective interfaces and said strain relief slots are centered on said interfaces.

8. The scanwheel of claim 1 additionally including a plurality of circumferentially distributed outboard slots between said strain relief slots and said facets.

9. The scanwheel of claim 8 wherein said respective plurality of slots are circumferentially staggered.

10. The scanwheel of claim 9 wherein said outboard slots are centered on said facets and said strain relief slots are centered on the web sections separating adjacent ones of said outboard slots.

* * * * *